United States Patent
Yu et al.

(10) Patent No.: US 10,437,573 B2
(45) Date of Patent: Oct. 8, 2019

(54) GENERAL PURPOSE DISTRIBUTED DATA PARALLEL COMPUTING USING A HIGH LEVEL LANGUAGE

(71) Applicant: Microsoft Technology Licensing, LLC, Redmond, WA (US)

(72) Inventors: Yuan Yu, Cupertino, CA (US); Dennis Fetterly, Belmont, CA (US); Michael Isard, San Francisco, CA (US); Ulfar Erlingsson, Palo Alto, CA (US); Mihai Budiu, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 150 days.

(21) Appl. No.: 15/645,620

(22) Filed: Jul. 10, 2017

(65) Prior Publication Data

US 2017/0371721 A1 Dec. 28, 2017

Related U.S. Application Data

(63) Continuation of application No. 14/807,390, filed on Jul. 23, 2015, now Pat. No. 9,720,743, which is a (Continued)

(51) Int. Cl.
*G06F 9/44* (2018.01)
*G06F 8/41* (2018.01)
(Continued)

(52) U.S. Cl.
CPC .............. *G06F 8/4441* (2013.01); *G06F 7/00* (2013.01); *G06F 8/445* (2013.01); *G06F 8/4434* (2013.01);
(Continued)

(58) Field of Classification Search
CPC ............. G06F 9/5044; G06F 16/24532; G06F 16/254; G06F 8/45; G06F 8/456;
(Continued)

(56) References Cited

U.S. PATENT DOCUMENTS 6,427,234 B1 7/2002 Chambers et al.
6,625,593 B1 * 9/2003 Leung ............... G06F 16/24532
(Continued)

OTHER PUBLICATIONS

Zachary G. Ives, An Adaptive Query Execution System for Data Integration, ACM SIGMOD Record, Jun. 1999, pp. 299-310, vol. 28, Issue 2, ACM, New York, NY, USA.
(Continued)

*Primary Examiner* — Tuan A Vu
(74) *Attorney, Agent, or Firm* — Mannava & Kang, P.C.

(57) ABSTRACT

General-purpose distributed data-parallel computing using a high-level language is disclosed. Data parallel portions of a sequential program that is written by a developer in a high-level language are automatically translated into a distributed execution plan. The distributed execution plan is then executed on large compute clusters. Thus, the developer is allowed to write the program using familiar programming constructs in the high level language. Moreover, developers without experience with distributed compute systems are able to take advantage of such systems.

15 Claims, 8 Drawing Sheets

Related U.S. Application Data continuation of application No. 12/368,231, filed on Feb. 9, 2009, now Pat. No. 9,110,706.

(51) Int. Cl.
    *G06F 7/00*     (2006.01)
    *G06F 8/20*     (2018.01)
    *G06F 3/00*     (2006.01)
    *G06F 9/52*     (2006.01)

(52) U.S. Cl.
CPC ............... *G06F 8/456* (2013.01); *G06F 3/00* (2013.01); *G06F 8/20* (2013.01); *G06F 8/24* (2013.01); *G06F 8/433* (2013.01); *G06F 8/458* (2013.01); *G06F 9/52* (2013.01)

(58) Field of Classification Search
CPC ...... G06F 8/4434; G06F 8/445; G06F 8/4441; G06F 3/00; G06F 7/00
See application file for complete search history.

(56) References Cited

U.S. PATENT DOCUMENTS

| | | | |
|---|---|---|---|
| 6,973,646 | B1 | 12/2005 | Bordawekar et al. |
| 7,010,521 | B2 | 3/2006 | Hinshaw et al. |
| 7,127,701 | B2 | 10/2006 | Fables et al. |
| 7,159,211 | B2 | 1/2007 | Jalan et al. |
| 7,966,311 | B2 | 6/2011 | Haase |
| 9,110,706 | B2 | 8/2015 | Yu et al. |
| 2004/0015834 | A1 | 1/2004 | Mestre et al. |
| 2004/0148397 | A1 | 7/2004 | Aronoff et al. |
| 2005/0027701 | A1 | 2/2005 | Zane et al. |
| 2006/0156284 | A1 | 7/2006 | Srinivasan |
| 2006/0218123 | A1 | 9/2006 | Chowdhuri et al. |
| 2007/0214111 | A1* | 9/2007 | Jin ........................ G06F 16/254 |
| 2007/0244876 | A1 | 10/2007 | Jin et al. |
| 2007/0250470 | A1 | 10/2007 | Duffy et al. |
| 2007/0288935 | A1 | 12/2007 | Tannenbaum et al. |
| 2007/0294681 | A1 | 12/2007 | Tuck et al. |
| 2008/0068389 | A1* | 3/2008 | Bakalash ............... G06F 9/5044 345/505 |
| 2008/0098375 | A1 | 4/2008 | Isard |
| 2009/0007087 | A1 | 1/2009 | Ito et al. |
| 2010/0088490 | A1* | 4/2010 | Chakradhar ............... G06F 8/45 712/34 |
| 2010/0205588 | A1 | 8/2010 | Yu et al. |
| 2015/0324242 | A1 | 11/2015 | Yu et al. |

OTHER PUBLICATIONS

Mark Leone, Dynamo: A Staged Compiler Architecture for Dynamic Program Optimization, Computer Science Department Technical Report #490, Sep. 1997, 17 pages, www.cs.indiana.edu/proglang/dynamo/tr490.pa.

Yuan Yu (project member), The Dryad LINQ Project, Microsoft Research, Copyright 2008, http://research.microsoft.com/research/sv/DryadLINQ/.

Chris Nyberg, Sort Benchmark, website, http://www.hpl.hp.com/hosted/sortbenchmark/.

C.K. Baru, DB2 Parallel Edition, IBM Systems Journal, 1995, pp. 292-322, vol. 34, No. 2., IBM 1995.

Micah Beck, NetSolve/D: A Massively Parallel Grid Execution System for Scalable Data Intensive Collaboration, Proceedings of the 19th IEEE International Parallel and Distributed Processing Symposium, IEEE Computer Society, 2005, http://ieeexplore.ieee.org/stamp/stamp.jsp?arnumber=01420135.

Guy E. Blelloch, Programming Parallel Algorithms, Communications of the ACM, Mar. 1996, pp. 85-97, vol. 39, No. 3, ACM, New York, NY, USA.

Robert D. Blumofe, Cilk: An Efficient Multithreaded Runtime System, ACM SIGPLAN Notices , Oct. 17, 1996, pp. 207-216, vol. 30, Issue 8, ACM, New York, NY, USA.

John Carnahan, Pipelets: A Framework for Distributed Computation, The 22nd International Conference on Machine Learning, Aug. 7-11, 2005, pp. 51-52, Bonn, Germany.

Fay Chang, BigTable: A Distributed Storage System for Structured Data, OSDI 2006, Google Inc., http://labs.google.com/papers/bigtable-osdi06.pdf.

Hung-Chih Yang, Map-reduce-merge: Simplified Relational Data Processing on Large Clusters, International Conference on Management of Data, Proceedings of the 2007 ACM SIGMOD international conference on Management of data in Beijing, China , Jun. 12-14, 2007, pp. 1029-1040, ACM, New York, NY, USA.

Cheng-Tao Chu, Map-Reduce for Machine Learning on Multicore, http://www.cs.stanford.edu/people/ang//papers/nips06-mapreducemulticore.pdf.

Lingkun Chu, Optimizing Data Aggregation for Cluster-Based Internet Services, ACM SIGPLAN Notices, Oct. 2003, pp. 119-130, vol. 38, Issue 10, ACM, New York, NY, USA.

Thierry Cruanes, Parallel SQL Execution in Oracle 10g, International Conference on Management of Data, Proceedings of the 2004 ACM SIGMOD international conference on Management of data in Paris, France, 2004, pp. 850-854, ACM, New York, NY, USA.

Jeffrey Dean, MapReduce: Simplified Data Processing on Large Clusters, Operating Systems Design and Implementation, Proceedings of the 6th conference on Symposium on Operating Systems Design & Implementation in San Francisco, CA, 2004, pp. 10-10, vol. 6, USENIX Association, Berkeley, CA, USA.

Amol Deshpande, Adaptive Query Processing, Now the Essence of Knowledge, 2007, pp. 2-140, vol. 1, No. 1, Now Publishers.

David J. Dewitt, The Gamma Database Machine Project, IEEE Transactions on Knowledge and Data Engineering, Mar. 1990, pp. 44-62, vol. 2, Issue 1, IEEE Educational Activities Department Piscataway, NJ, USA.

David J. Dewitt, Parallel Database Systems: The Future of High Performance Database Processing, Communications of the ACM, Jan. 1992, pp. 85-98, ACM, New York, NY, USA.

Joe Duffy, A Query Language for Data Parallel Programming, Declarative Aspects of Multicore Programming Workshop, Copyright 2007 Microsoft Corporation, www.bluebytesoftware.com/code/07/01/2007_01_POPL_DAMP_plinq.ppt.

Susanne Englert, Parallelism and Its Price: A Case Study of Nonstop SQL/MP, ACM SIGMOD Record, Dec. 1995, pp. 61-67, vol. 24, Issue 4, ACM, New York, NY, USA.

L. Feng, Buffer Management in Distributed Database Systems: A Data Mining Based Approach, Extending Database Technology, Proceedings of the 6th International Conference on Extending Database Technology: Advances in Database Technology, pp. 246-260, vol. 1377, Springer-Verlag London, UK.

Goetz Graefe, Encapsulation of Parallelism in the Volcano Query Processing System, International Conference on Management of Data, Proceedings of the 1990 ACM SIGMOD international conference on Management of data, 1990, pp. 102-111, ACM, New York, NY, USA.

Jim Gray, Data Mining the SDSS SkyServer Database, Technical Report MSR-TR-2002-01 Microsoft Research, Jan. 2002, www.sdss.jhu.edu/ScienceArchive/pubs/msr-tr-2002-01.pdf.

Waqar Hasan, Open Issues in Parallel Query Optimization, ACM SIGMOD Record, Sep. 1996, pp. 28-33, vol. 25, Issue 3, ACM, New York, NY, USA.

Joseph M. Hellerstein, Architecture of a Database System, NOW The Essence of Knowledge, 2007, pp. 141-259, vol. 1, No. 2, Now Publishers.

Michael Isard, Dryad: Distributed Data-Parallel Programs from Sequential Building Blocks, EuroSys' 07 in Lisboa, Portugal , Mar. 21-23, 2007, 14 pages.

Niebojsa Jojic, Epitomic Analysis of Appearance and Shape, ICCV, Proceedings of the Ninth IEEE International Conference on Computer Vision, 2003, p. 34, vol. 2., IEEE Computer Society Washington, DC, USA.

Navin Kabra, Efficient Mid-Query Re-Optimization of Sub Optimal Query Execution Plans, International Conference on Management of Data, Proceedings of the 1998 ACM SIGMOD international conference on Management of data in Seattle, WA, 1998, pp. 106-117, ACM, New York, NY, USA.

(56) References Cited

OTHER PUBLICATIONS

Donald Kossmann, The State of the Art in Distributed Query Processing, ACM Computing Surveys, Dec. 2000, pp. 422-469, vol. 32, No. 4, ACM, New York, NY, USA.
Erik Meijer, Unifying Tables, Objects and Documents, Microsoft Corporation, http://research.microsoft.com/~emeijer/Papers/XS.pdf.
Franck Morvan, Dynamic Memory Allocation Strategies for Parallel Query Execution, Symposium on Applied Computing, Proceedings of the 2002 ACM symposium on Applied computing in Madrid, Spain, 2002, pp. 897-901, ACM, New York, NY, USA.
Tom Oinn, Tavema: Lessons in Creating a Workflow Environment for the Life Sciences, Concurrency and Computation: Practice and Experience, 2006, pp. 1067-1100, vol. 18, Issue 10, John Wiley and Sons Ltd., Chichester, UK.
Christopher Olston, Pig Latin: A not-so-Foreign Language for Data Processing, International Conference on Management of Data, Proceedings of the 2008 ACM SIGMOD international conference on Management of data in Vancouver, Canada, 2008, pp. 1099-1110, ACM, New York, NY, USA.
Rob Pike, Interpreting the Data: Parallel Analysis with Sawzall, Scientific Programming, 2005, pp. 277-298, vol. 13, Issue 4, IOS Press Amsterdam, The Netherlands.
Aleksandr Simma, CT-NOR: Representing and Reasoning About Events in Continuous Time, Microsoft Research, http://uai2008.cs.helsinki.fi/UAI_camera_ready/simma.pdf.
Mike Stonebraker, C-store: A Column-Oriented DBMS, Proceedings of the 31st VLDB Conference in Trondheim, Norway, 2005, 12 pages, http://db.csail.mit.edu/projects/cstore/vldb.pdf.
Mike Stonebraker, One Size Fits All? Part 2: Benchmarking Results, 3rd Biennial Conference of Innovative Data Systems Research, Jan. 7-10, 2007, Asilomar, CA, USA, http://nms.csail.mit.edu/~stavros/pubs/osfa.pdf.
Mike Stonebraker, The End of an Architectural Era (It's Time for a Complete Rewrite), VLDB '07 in Vienna, Austria, Sep. 23-28, 2007, http://nms.csail.mit.edu/~stavros/pubs/hstore.pdf.
P.W. Trinder, Parallel and Distributed Haskells, Journal of Functional Programming, 2002, pp. 469-510, Cambridge University Press, http://citeseerx.ist.psu.edu/viewdoc/summary?doi=10.1.1.20.3677.
Yuan Yu, Some Sample Programs Written in DryadLINQ, May 11, 2008, ftp://ftp.research.microsoft.com/pub/tr/TR-2008-74.pdf.
Yong Zhao, Swift: Fast, Reliable, Loosely Coupled Parallel Computation, 2007 International Workshop on Scientific Workflows, 2007, Salt Lake City, UT, USA, http://www.ci.uchicago.edu/swift/papers/Swift-SWF07.pdf.
Global Grid Forum, Open Grid Forum, Website, http://www.gridforum.org/.
Intel IXP2XXX Product Line of Network Processors, Website, http://www.intel.com/design/network/products/npfamily/ixp2xxx.htm.
Open MPI: Open Source High Performance Computing, Website, http://www.open-mpi.org/.
Thomas E. Anderson, A Case for Networks of Workstations, IEEE Micro, Dec. 4, 1994, pp. 54-64, vol. 15, Issue 1, IEEE Computer Society Press 1995, Los Alamitos, CA, USA.
Remzi H. Arpaci-Dusseau, Run-Time Adaptation in River, ACM Transactions on Computer Systems, Feb. 2003, pp. 36-86, vol. 21, No. 1, ACM Press, New York, NY, USA.
Ozalp Babaoglu, Paralex: An Environment for Parallel Programming in Distributed Systems, Laboratory for Computer Science Technical Report UBLCS-92-4, Oct. 1992, Cornell University Ithaca, NY, USA.
Magdalena Balazinska, Fault-Tolerance in the Borealis Distributed Stream Processing System, SIGMOD 2005, Jun. 14-16, 2005, ACM Press, New York, NY, USA.
Tom Barclay, Loading Databases Using Dataflow Parallelism, Digital San Francisco System Center Technical Report 94.2, ACM SIGMOD Record, Jul. 1994, pp. 72-83, vol. 23, No. 4, ACM Press, New York, NY, USA.

Dhaitanya Baru, An Overview of DB2 Parallel Edition, International Conference on Management of Data, Proceedings of the 1995 ACM SIGMOD international conference on Management of data in San Jose, CA, 1995, pp. 460-462, ACM, New York, NY, USA.
Eylon Caspi, Stream Computations Organized for Reconfigurable Execution (SCORE): Introduction and Tutorial, Aug. 25, 2005, Version 1, http://citeseerx.ist.psu.edu/viewdoc/summary?doi=10.1.1.36.6330.
Armando Fox, Cluster-Based Scalable Network Services, Proceedings of the 16th ACM Symposium on Operating Systems Principles in Saint-Malo, France, Oct. 1997, pp. 78-91, vol. 31, Issue 5, ACM, New York, NY, USA.
Sanjay Ghemawat, The Google File System, ACM Symposium on Operating Systems Principles, Proceedings of the nineteenth ACM symposium on Operating systems principles in Bolton Landing, NY, Oct. 19-22, 2003, pp. 29-43, ACM, New York, NY, USA.
Jeong-Hyon Hwang, A Comparison of Stream-Oriented High-Availability Algorithms, http://nms.lcs.mit.edu/projects/medusa/stream-ha-tech-report.pdf.
Ujval J. Kapasi, The Imagine Stream Processor, 2002 International Conference on Computer Design, http://cva.stanford.edu/publications/2002/kapasi_iccd2002_arch.pdf.
Eddie Kohler, The Click Modular Router, Laboratory for Computer Science, MIT, ACM SIGOPS Operating Systems Review, Dec. 1999, pp. 217-231, vol. 33, Issue 5, ACM, New York, NY, USA.
James R. Larus, Using Cohort Scheduling to Enhance Server Performance, Language, Compiler and Tool Support for Embedded Systems, Proceedings of the ACM SIGPLAN workshop on Languages, compilers and tools for embedded systems in Snow Bird, UT, 2001, pp. 182-187, ACM, New York, NY, USA.
Enrique Vinicio Carrera E., P-RIO: A Modular Parallel-Programming Environment, IEEE, Jan.-Mar. 1998, pp. 47-57, vol. 6, Issue 1, http://ieeexplore.ieee.org/Xplore/login.jsp?url=/iel3/4434/14312/00656779.pdf?arnumber=656779.
William R. Mark, Cg: A System for Programming Graphics Hardware in a C-Like Language, International Conference on Computer Graphics and Interactive Techniques, ACM SIGGRAPH 2003 Papers, 2003, pp. 896-907, ACM, New York, NY, USA.
Peter Newton, The CODE 2.0 Graphical Parallel Programming Language, International Conference on Supercomputing, Proceedings of the 6th international conference on Supercomputing, Jul. 1992, pp. 167-177, ACM, New York, NY, USA.
Ken Phillips, SenSage ESA, SC Magazine online, Mar. 1, 2006, http://www.securecomputing.net.au/Review/66218,sensage-esa.aspx.
Mehul A. Shah, Highly Available, Fault Tolerant, Parallel Dataflows, Sigmod 2004 in Paris, France, Jun. 13-18, 2004, pp. 827-838, ACM, New York, NY, USA.
V.S. Sunderam, PVM: A Framework for Parallel Distributed Computing, Concurrency: Practice and Experience, 1990, pp. 315-339, vol. 2, Issue 4, John Wiley and Sons Ltd. Chichester, UK.
David Tarditi, Accelerator: Using Data-Parallelism to Program GPUs for General-Purpose Uses, Architectural Support for Programming Languages and Operating Systems, Proceedings of the 12th international conference on Architectural support for programming languages and operating systems in San Jose, CA, 2006, pp. 325-335, ACM, New York, NY, USA.
Douglas Thain, Distributed Computing in Practice: The Condor Experience, Concurrency and Computation: Practice & Experience, 2005, pp. 323-356, vol. 17, Issue 2-4, John Wiley and Sons Ltd. Chichester, UK.
The LINQ Project, Copyright 2009 Microsoft Corporation, http://msdn.microsoft.com/netframework/future/linq/.
H. Boral, Prototyping Bubba, A Highly Parallel Database System, IEEE Transactions on Knowledge and Data Engineering, Mar. 1990, pp. 2-24, vol. 2, Issue 1, IEEE Educational Activities Department, Piscataway, NJ, USA.
Ian J. Taylor, Workflows for E-Science, 2006, Springer-Verlang New York Inc., Secaucus, NJ, USA.
SQL Server Integration Services, http://www.microsoft.com/sqlserver/2005/en/us/integration-services.aspx.
D.C. Dinucci, Design and Implementation of Parallel Programs with LGDF2, COMPCON Spring apos;89. Thirty-Fourth IEEE

(56) References Cited

OTHER PUBLICATIONS

Computer Society International Conference: Intellectual Leverage, Digest of Papers, Feb. 27-Mar. 3, 1989, pp. 102-107.
Alex Szalay, Science in an Exponential World, Australiasia eResearch Conference, 2007, Brisbane, Austratlia, powerpoint presentation.
Yuan Yu, DryadLINQ: A System for General-Purpose Distributed Data-Parallel Computing Using a High-Level Language, 8th USENIX Symposium on Operating Systems Design and Implementation, USENIX Association, http://research.microsoft.com/en-us/projects/dryadlinq/dryadlinq.pdf.
Preliminary Amendment dated Mar. 6, 2009, U.S. Appl. No. 12/368,231, filed Feb. 9, 2009.
Non-final Office Action dated Jul. 5, 2012, U.S. Appl. No. 12/368,231, filed Feb. 9, 2009.
Response to Office Action dated Sep. 20, 2012, U.S. Appl. No. 12/368,231, filed Feb. 9, 2009.
Final Office Action dated Dec. 6, 2012, U.S. Appl. No. 12/368,231, filed Feb. 9, 2009.
Response to Office Action dated Mar. 6, 2013, U.S. Appl. No. 12/368,231, filed Feb. 9, 2009.
Non-final Office Action dated Sep. 19, 2013, U.S. Appl. No. 12/368,231, filed Feb. 9, 2009.
Response to Office Action dated Dec. 13, 2013, U.S. Appl. No. 12/368,231, filed Feb. 9, 2009.
Final Office Action dated May 1, 2014, U.S. Appl. No. 12/368,231, filed Feb. 9, 2009.
Response to Office Action dated Jul. 31, 2014, U.S. Appl. No. 12/368,231, filed Feb. 9, 2009.
Non-final Office Action dated Sep. 8, 2014, U.S. Appl. No. 12/368,231, filed Feb. 9, 2009.
Response to Office Action dated Oct. 29, 2014, U.S. Appl. No. 12/368,231, filed Feb. 9, 2009.
Final Office Action dated Nov. 17, 2014, U.S. Appl. No. 12/368,231, filed Feb. 9, 2009.
Response to Office Action dated Feb. 13, 2015, U.S. Appl. No. 12/368,231, filed Feb. 9, 2009.
Notice of Allowance dated Apr. 14, 2015, U.S. Appl. No. 12/368,231, filed Feb. 9, 2009.
Preliminary Amendment dated Feb. 5, 2016, U.S. Appl. No. 14/807,390, filed Jul. 23, 2015.
Non-final Office Action dated Aug. 18, 2016, U.S. Appl. No. 14/807,390, filed Jul. 23, 2015.
Response to Office Action dated Nov. 15, 2016, U.S. Appl. No. 14/807,390, filed Jul. 23, 2015.
Final Office Action dated Dec. 28, 2016, U.S. Appl. No. 14/807,390, filed Jul. 23, 2015.
Response to Office Action dated Feb. 7, 2017, U.S. Appl. No. 14/807,390, filed Jul. 23, 2015.
Notice of Allowance dated Mar. 27, 2017, U.S. Appl. No. 14/807,390, filed Jul. 23, 2015.

* cited by examiner

US 10,437,573 B2

GENERAL PURPOSE DISTRIBUTED DATA PARALLEL COMPUTING USING A HIGH LEVEL LANGUAGE

CLAIM OF PRIORITY

This application is a continuation application of U.S. patent application Ser. No. 14/807,390, entitled "GENERAL PURPOSE DISTRIBUTED DATA PARALLEL COMPUTING USING A HIGH LEVEL LANGUAGE," which is a continuation application of U.S. patent application Ser. No. 12/368,231, entitled "GENERAL PURPOSE DISTRIBUTED DATA PARALLEL COMPUTING USING A HIGH LEVEL LANGUAGE," filed Feb. 9, 2009, published as US 2010/0205588 on Aug. 12, 2010 and issued as U.S. Pat. No. 9,110,706 on Aug. 18, 2015, and incorporated herein by reference in its entirety.

BACKGROUND

One of the most challenging problems in the field of computing today is how to allow a wide variety of software developers to compute effectively on large amounts of data.

Parallel processing is one technique that has been employed for increasing the efficiency of computing on large amounts of data. Traditionally, parallel processing refers to the concept of speeding-up the execution of a program by dividing the program into multiple fragments that can execute concurrently, each on its own processor. A program being executed across n processors might execute n times faster than it would using a single processor. The terms concurrently and parallel are used to refer to the situation where the period for executing two or more processes overlap in time, even if they start and stop at different times. It is possible to perform parallel processing by connecting multiple computers in a network and distributing portions of the program to different computers on the network.

However, many software application developers are not experienced with parallel processing. Therefore, it can be difficult for them to write an application that can take advantage of parallel processing. Moreover, it is often difficult to divide an application program in such a way that separate processors can execute different portions of a program without interfering with each other. There has been a great deal of research performed with respect to automatically discovering and exploiting parallelism in programs which were written to be sequential. The results of that prior research, however, have not been successful enough for most developers to efficiently take advantage of parallel processing in a cost effective manner.

SUMMARY

The technology described herein pertains to general-purpose distributed data-parallel computing using a high-level language. Data parallel portions of a sequential program that is written by a developer in a high-level language are automatically translated into a distributed execution plan. The distributed execution plan is then executed in a distributed compute system. Thus, the developer is allowed to write the program using familiar programming constructs in the high level language. Moreover, developers without experience with distributed compute systems are able to take advantage of such systems.

In one embodiment, an expression is accessed from a program running at a client machine. An execution plan is automatically generated for executing the expression in parallel at nodes of a compute cluster. The execution plan is provided to an execution engine that controls parallel execution of the expression in the compute cluster.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technology described herein pertains to general-purpose distributed data-parallel computing using a high-level language. A developer creates a sequential program in a high level language ("application program"). The application program may be a hybrid program that has code that executes on a client machine and data-parallel portions that are executed in parallel in a compute cluster. For example, the data-parallel portions that execute in the compute cluster might rank web pages, whereas the code that executes on the client might display a graphic to a user based on the ranking. In some implementations, a distributed execution provider automatically translates the data-parallel portions of the application program into a distributed execution plan. The distributed execution plan is then executed on nodes in a compute cluster. In some embodiments, the distributed execution plan includes an execution plan graph ("EPG") and code for the vertices of the EPG ("vertex code"). The distributed execution provider may also serialize data objects that are referenced in the application program and needed for execution of the vertex code in the compute cluster. Moreover, serialization code that allows access to data types of the objects in the application program is generated. The serialized data objects and serialization code may be considered to be part of the distributed execution plan. In some embodiments, the distributed execution provider generates additional code, such as code that is used to facilitate optimizing execution in the compute cluster.

In some embodiments, the overall system can be considered to be broken into three distinct pieces: 1) an application layer, 2) an execution engine, and 3) storage. The application layer includes both the application that the developer wrote and the distributed execution provider that automatically generates the distributed execution plan. The execution engine receives the execution plan and manages parallel execution in the compute cluster. This separation may allow the application layer to interoperate with a variety of different types of execution engines, as well as a variety of different types of storage layers.

Figure 1:
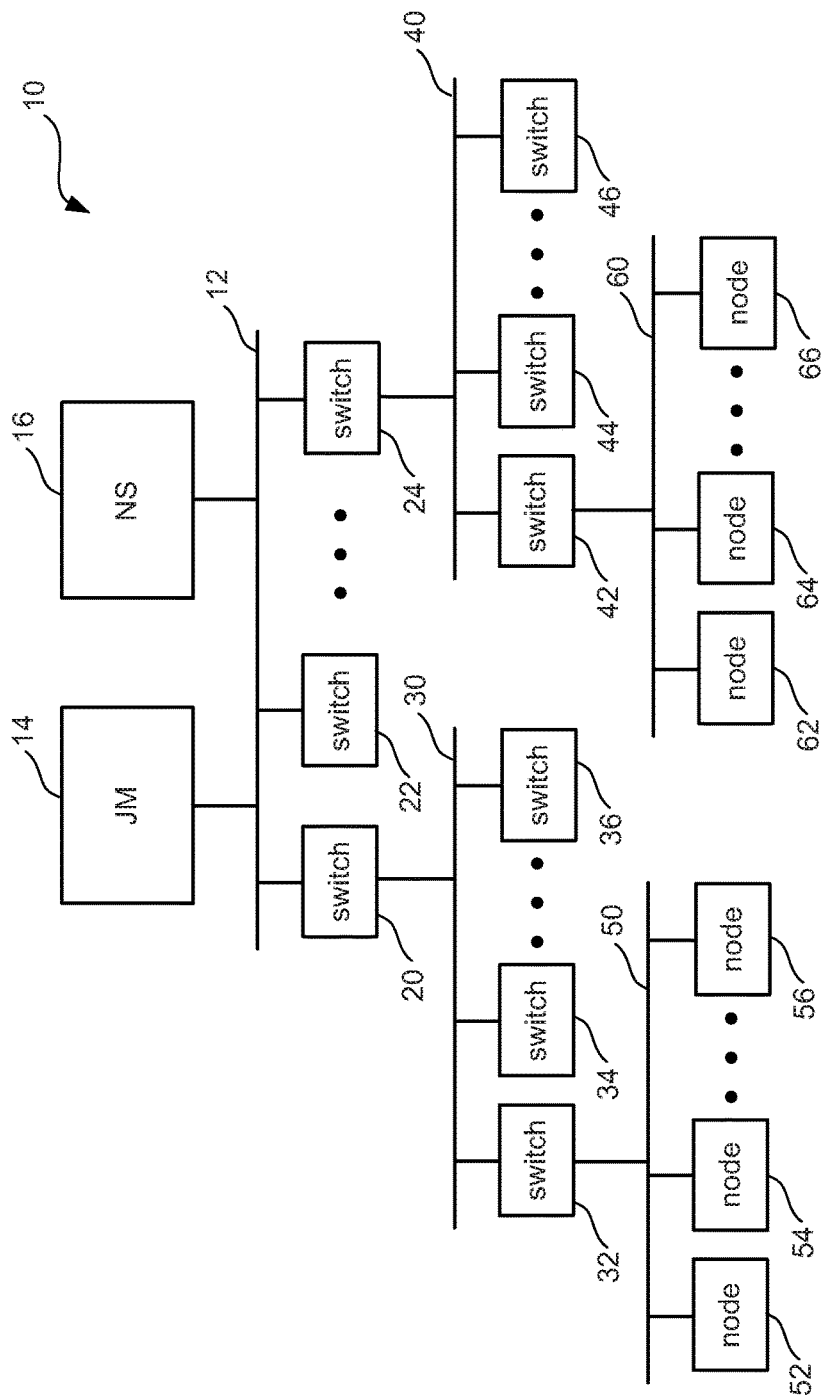
FIG. 1 is a block diagram of one embodiment of hardware organization of a distributed execution engine, as well as software that runs thereon.

In some embodiments, the distributed execution provider provides the automatically generated distributed execution plan (e.g., EPG, vertex code, serialized data objects and serialization code) to an execution engine for execution in the compute cluster. Thus, the execution engine may be a separate program from the distributed execution provider that generated the distributed execution plan. FIG. 1 is a block diagram of an architecture for a suitable execution engine that is implemented as a tree-structure network 10 having various sub-networks within the tree-structure connected via switches. The execution engine can be used to cause the data-parallel portions of the application program to execute in the compute cluster. However, note that the data-parallel portions of the application program can be executed by a different execution engine than the example described herein. In other words, the code that is automatically generated (e.g., vertex code) can be executed by a different execution engine.

Sub-network 12 includes Job Manager 14 and Name Server 16. Sub-network 12 also includes a set of switches 20, 22, . . . , 24. Each switch connects sub-network 12 with a different sub-network. For example, switch 20 is connected to sub-network 30 and switch 24 is connected to sub-network 40. Sub-network 30 includes a set of switches 32, 34, . . . , 36. Sub-network 40 includes a set of switches 42, 44, . . . , 46. Switch 32 is connected to sub-network 50. Switch 42 is connected to sub-network 60. Sub-network 50 includes a set of computing machines 52, 54, . . . , 56. Sub-network 60 includes a set of computing machines 62, 64, . . . , 66. Computing machines 52, 54, . . . , 56 and 62, 64, . . . , 66 (as well as other computing machines at the bottom levels of the hierarchy of the tree-structured network) make up the cluster of machines that form the distributed execution engine. Although FIG. 1 shows three levels of hierarchy, more or fewer than three levels can be used. In another embodiment the network may not be tree-structured, for example it could be arranged as a hypercube.

The automatically generated vertex code is executed as a parallel processing job (hereinafter referred to as a "job") that is coordinated by Job Manager 14, which is a process running on a dedicated computing machine or on one of the computing machines in the compute cluster. Job manager 14 is responsible for instantiating a job's dataflow graph, scheduling processes on nodes in the compute cluster to cause the vertex code to execute, providing fault-tolerance by re-executing failed or slow processes, monitoring the job and collecting statistics, and transforming the job dataflow graph (or simply "job graph") dynamically based on callbacks in order to optimize execution. Name Server 16 is used to report the names (or other identification information such as IP Addresses) and position in the network of all of the computing machines in the cluster. There is a simple daemon (or service) running on each computing machine in the cluster which is responsible for creating processes on behalf of Job Manager 14.

Figure 2:
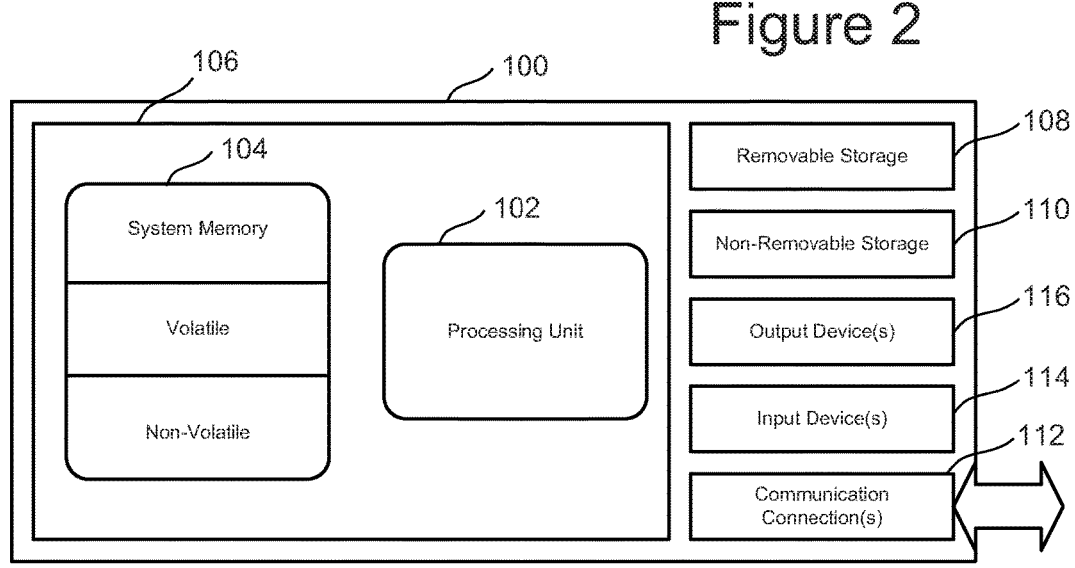
FIG. 2 is a block diagram of a computing machine that can be used to implement one embodiment of the nodes depicted in FIG. 1.

FIG. 2 depicts an exemplary computing device 100 for implementing the various computing machines of the cluster (e.g., machines 52, 54, . . . , 56 and 62, 64, . . . , 66), Job Manager 14 and/or Name Server 16. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. Processing unit 102 may be a single core, dual core or other form of multiple core processing unit. This most basic configuration is illustrated in FIG. 2 by line 106.

Additionally, device 100 may also have additional features/functionality. For example, device 100 may also include additional storage (removable and/or non-removable) including, but not limited to, magnetic disk, optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer (or processor) readable storage media. Such media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices via a wired or wireless network. Examples of communications connections include network cards for LAN connections, wireless networking cards, modems, etc.

Device 100 may also have input device(s) 114 such as keyboard, mouse, pen, voice input device, touch input device, etc. Output device(s) 116 such as a display/monitor, speakers, printer, etc. may also be included. All these devices (input, output, communication and storage) are in communication with the processor.

The technology described herein can be implemented using hardware, software, or a combination of both hardware and software. The software used is stored on one or more of the processor readable storage devices described above to program one or more of the processors to perform the functions described herein. In alternative embodiments, some or all of the software can be replaced by dedicated hardware including custom integrated circuits, gate arrays, FPGAs, PLDs, and special purpose computers.

Figure 3:
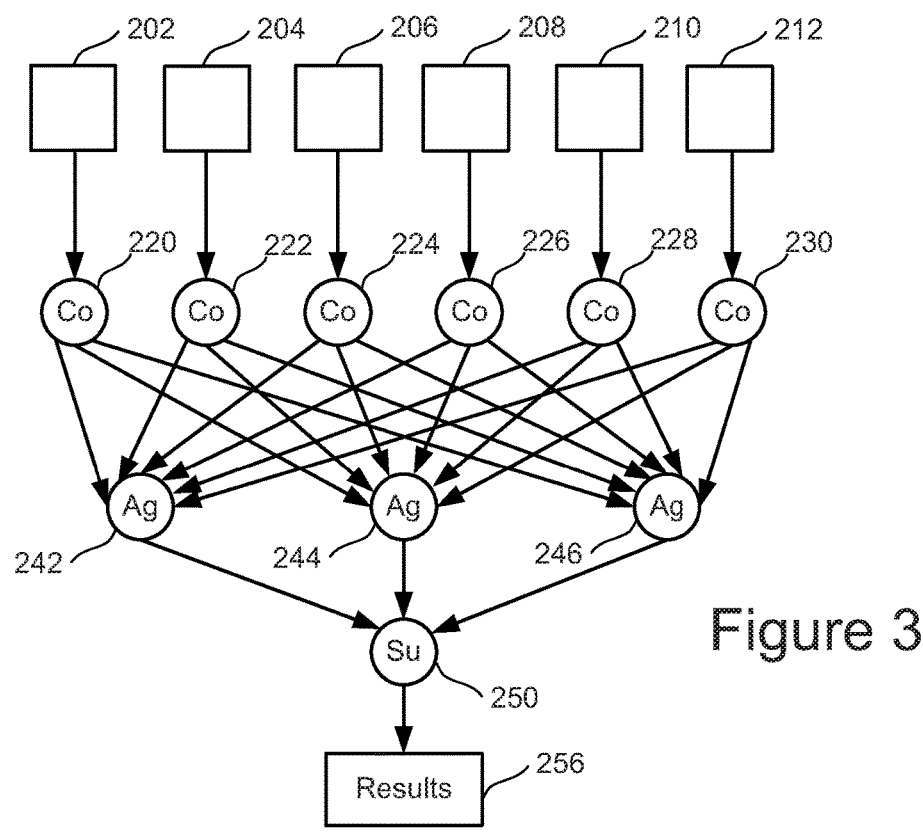
FIG. 3 is an example of a directed graph.

In some embodiments, a distribution execution provider analyzes portions of the user application and automatically generates a file that describes a directed graph (also referred to herein as an EPG) and code for vertices of the directed graph. As an example, the file that describes the directed graph could be an XML file. Job Manager 14 will build a job graph based on the file that describes the directed graph and manage the distribution of the vertex code to the various compute nodes of the distributed compute cluster. FIG. 3 provides one example of a block diagram of a directed graph that represents a system that reads query logs gathered by an Internet search service, extracts the query strings, and builds a histogram of query frequencies sorted by frequency. In the example of FIG. 3, the directed graph is acyclic; however, the directed graph could be cyclic.

In some embodiments, a job's external input and output files are represented as vertices in the graph even though they do not execute any program. Typically, for a large job, a single logical "input" is split into multiple partitions which are distributed across nodes in the system as separate files. Each of these partitions can be represented as a distinct input vertex. In some embodiments, there is a graph constructor which takes the name of a distributed file and returns a graph made from a sequence of its partitions. The application will interrogate its input graph to read the number of partitions at runtime in order to generate the appropriate replicated graph. For example, FIG. 3 shows six partitions or files 202, 204, 206, 208, 210 and 212 of the log created by the Internet search service.

The first level of the hierarchy of the graph of FIG. 3 includes vertex code (Co) for implementing vertices 220, 222, 224, 226, 228 and 230. Herein, the code for a particular vertex may also be referred to as a "vertex program" or simply a "vertex." As already stated, a distributed execution provider of some embodiments automatically generates this vertex code from expressions in the application program running on the client machine. The vertex code (Co) reads its part of the log files, parses the data to extract the query strings, sorts the query string based on a hash of the query string, and accumulates the total counts for each query string. Although eight vertices are shown (220, 222, . . . 230), more or fewer than eight vertices can be used. In one embodiment, there will be one vertex at this level for each partition of the log. Each of the vertices will output a set of hashes representing the query strings and a total count for each hash. This information will then be sent to an appropriate aggregator (Ag) vertex, depending on the hash.

FIG. 3 shows three vertices 242, 244 and 246 implementing the aggregator (Ag). The potential set of queries will be broken up into three buckets, with one subset of hashes being sent to aggregator 242, a second subset of hashes being sent to aggregator 244, and a third subset of hashes being sent to aggregator 246. In some implementations, there will be more or fewer than three aggregators. Each of the vertices 220-230 will be in communication with all of the aggregators to send data to the appropriate aggregator based on the hash. The aggregators 242, 244 and 246 will aggregate all of the counts for each query based on data received from vertices 220-230. Each of the aggregators 242, 244 and 246 will report its data to (Su) vertex 250, which will combine the sums for all of these various queries and store those sums in results file 256. As can be seen, vertices 220-230 access data in parallel and can be executed in parallel. Similarly, aggregators 242-246 can also be executed in parallel. Thus, Job Manager 14 will distribute the vertex code to maximize efficiency for the system.

In one embodiment, a job utilizing the technology described herein has two levels of abstraction. At a first level of abstraction, the overall structure of the job is determined by the communication flow. This communication flow is the directed graph where each vertex is a process and edges represent data channels. In some embodiments, the directed graph is automatically generated based on analysis of the application program running on the client. The directed graph is automatically mapped onto physical resources by the execution engine. The second level of abstraction is the vertex code which implement the vertices.

In some embodiments, every vertex program deals with its input and output through the channel abstraction. As far as the body of vertex programs is concerned, channels transport objects. This ensures that the same vertex program is able to consume its input either from disk or when connected to a shared memory channel—the last case avoids serialization/deserialization overhead by passing the pointers to the objects directly between producer and consumer. Note that other channels implementations including, but not limited to, TCP pipes and HTTP connections are possible.

In some implementations, the base class for vertex programs supplies methods for reading any initialization parameters which were set during graph construction and transmitted as part of the vertex invocation. These include a list of string arguments and an opaque buffer into which the program may serialize arbitrary data. When a vertex program is first started but before any channels are opened, the runtime calls a virtual initialization method on the base class. This method receives arguments describing the number of input and output channels connected to it.

In one implementation, the input and output channels are opened before the vertex program starts. In another implementation channels are opened as needed, which requires fewer resources on the channel endpoint from which data originates and which may speed-up execution. In some cases, channels are opened in a random order to minimize resource contention. Any error at this stage causes the vertex program to report the failure and exit. This will trigger Job Manager 14 to try to recreate the missing input. In other embodiments, other schemes can be used. When all of the channels are opened, a vertex Main routine is called and passed channel readers and writers for all its inputs and outputs respectively. The readers and writers may have a blocking interface to read or write the next item which suffices for most simple applications. There may be a method on the base class for inputting status which can be read by the monitoring system, and the progress of channels may be automatically monitored. An error reporting interface allows that vertex program to communicate a formatted string along with any additional application-defined metadata. The vertex program may exit before reading all of its inputs. A process which contains a long pipeline of vertex programs connected via shared memory channels and ending, for example, with a "Head" vertex will propagate the early termination of Head all the way back to the start of the pipeline and exit without reading any unused portion of its inputs. In other embodiments, other schemes can be used.

Figure 4:
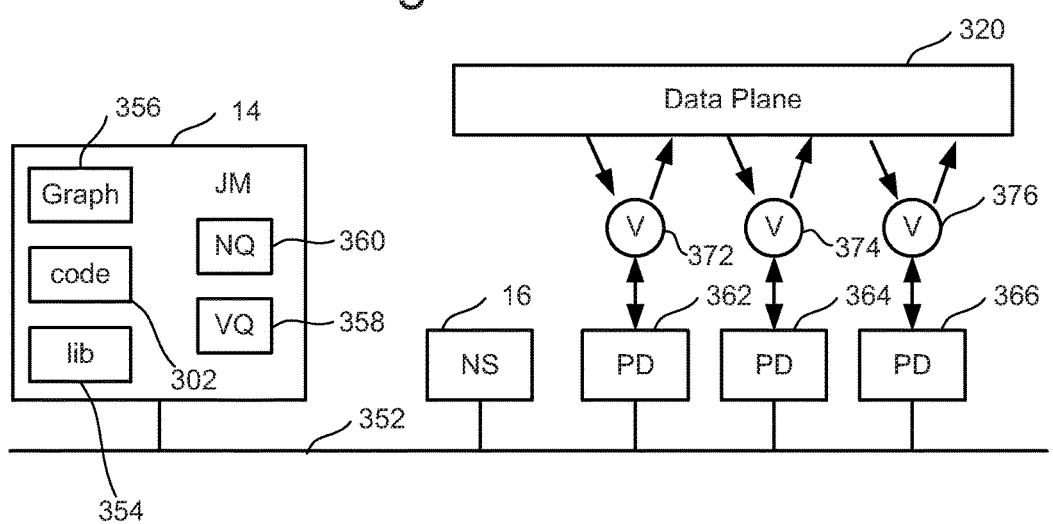
FIG. 4 is a logical view of the system depicted in FIG. 1.

FIG. 4 provides a logical view of the system depicted in FIG. 1 and how that system makes use of the vertex code 302. FIG. 4 shows Job Manager 14 connected to network system 352, which can be the network 10 of FIG. 1. Also connected to network system 352 are Name Service 316 and a set of computing machines 362, 364 and 366. Although FIG. 4 only shows three computing machines, it is possible to have fewer than three computing machines or more than three computing machines. In some embodiments there could be thousands of computing machines. Each computing machine has a process daemon (PD) running. Job Manager 14 will cause the various process daemons to run various vertices (e.g., vertices 372, 374, 376), which are in communication with the data plane 320, which is an arbitrary data transport mechanism used to implement channels (e.g., files, TCP pipes, or shared memory channels). Job Manager 14 includes vertex code 302, library 354, job graph 356, Vertex Queue 358, and Node Queue 360.

Library 354 provides a set of code to enable Job Manager 14 to create a job graph 356, build the job graph 356, and execute the job graph 356 across the distributed execution engine. In one embodiment, library 354 can be embedded in C++ using a mixture of method calls and operator overloading. In one embodiment, library 354 defines a C++ base class from which all vertex programs inherit. Each such program has a textural name (which is unique within an application) and a static "factory" which knows how to construct it. A graph vertex may be created by calling the appropriate static program factory. Any required vertex-specific parameter can be set at this point by calling methods on the program object. The parameters are then marshaled along with the unique vertex name (referred to herein as a unique identification-UID) to form a simple closure which can be sent to a remote process or execution. Every vertex program is placed in a stage. In some implementations, a stage is created by replicating one vertex. In a large job, all the vertices in a level of hierarchy of the graph might live in the same stage; however, this is not required. In other embodiments, other schemes can be used.

The first time a vertex program is executed on a computer, its binary is sent from the Job Manager 14 to the appropriate process daemon (PD). The vertex program can be subsequently executed from a cache. In some embodiments, all vertices in a job share the same binary, which allows for efficient caching because vertex binaries sent for one stage can be reused by other stages. Job Manager 14 can communicate with the remote vertices, monitor the state of the computation, monitor how much data has been read, and monitor how much data has been written on its channels. Legacy executables can be supported as vertex programs by connecting the legacy executable with named pipes to a stub which redirects the data from the pipes to channels.

Job Manager 14 keeps track of the state and history of each vertex program in the job graph 356. A vertex program may be executed multiple times over the length of the job due to failures, and certain policies for fault tolerance. In one implementation, each execution of the vertex program has a version number and a corresponding execution record which contains the state of the execution and the versions of the predecessor vertices from which its inputs are derived. In one aspect, each execution names its file-based output channel uniquely using its version number to avoid conflicts when multiple versions execute simultaneously. In one implementation, each vertex executes in a separate isolated "sand-box." Therefore, multiple versions of the same vertex do not clash because each one uses a separate sand-box. One implementation of sand-boxes is to use separate root directories. However, more complex implementations, based on virtual machines are possible. The sand-boxes may be managed by the process daemons. If the entire job completes successfully, then each vertex program selects one of its successful executions and renames the output files to their correct final forms.

When all of a vertex program's input channels become ready, a new execution record is created for the vertex program in the "Ready" state and gets placed in Vertex Queue 358. A disk based channel is considered to be ready when the entire file is present. A channel which is a TCP pipe or shared memory FIFO is ready when the predecessor vertex has at least one execution record in the "Running" state.

Each of the vertex's channels may specify a "hard constraint" or a "preference" listing the set of computing machines on which it would like to run. The constraints are attached to the execution record when it is added to Vertex Queue 358 and they allow the application writer to require that a vertex be collocated with a large input file, and in general that the Job Manager 14 preferentially run computations close to their data.

When a Ready execution record is paired with an available computer it transitions to the Running state (which may trigger vertices connected to its parent via pipes or FIFOs to create new Ready records). While an execution is in the Running state, Job Manager 14 receives periodic status updates from the vertex. On successful completion, the execution record enters the "Completed" state. If the vertex execution fails, the record enters the "Failed" state, which may cause failure to propagate to other vertices executing in the system. A vertex that has failed will be restarted according to a fault tolerance policy. If every vertex simultaneously has at least one Completed execution record, then the job is deemed to have completed successfully. If any vertex is reincarnated more than a set number of times, the entire job has failed.

Files representing temporary channels are stored in directories managed by the process daemon and are cleaned up after job completion. Similarly, vertices are killed by the process daemon if their parent job manager crashes.

Figure 5:
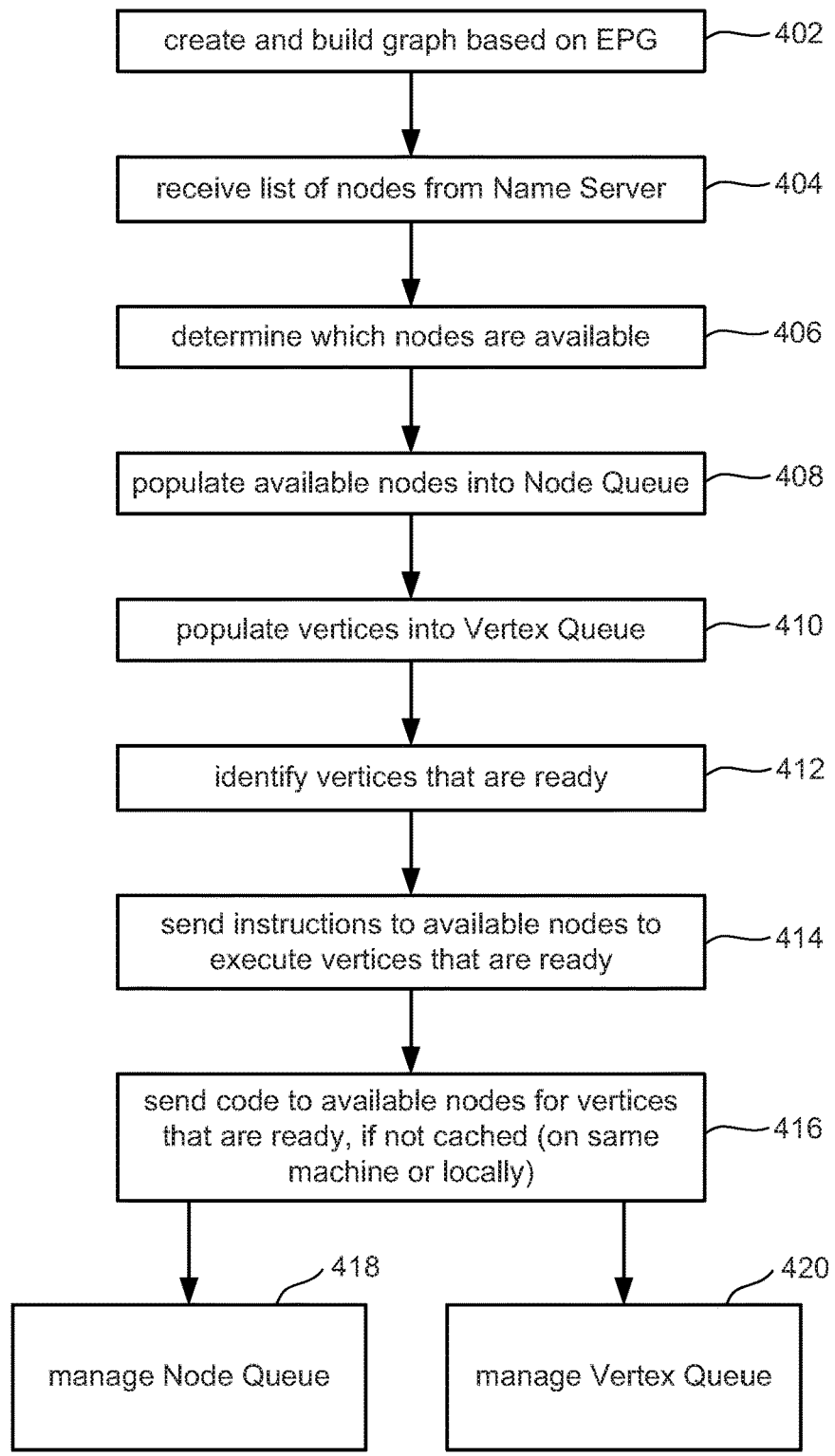
FIG. 5 depicts a flowchart describing one embodiment of a process performed by a job manager when executing code on the distributed execution engine of FIG. 1.

FIG. 5 depicts a flowchart describing one embodiment of a process performed by Job Manager 14 when executing vertex code 302 on the distributed execution engine of FIG. 1. In step 402, Job Manager 14 creates the job graph 356 based on the EPG and vertex code 302. In one embodiment, the EPG is a description of an execution plan, such as a description written in XML. Thus, Job Manager 14 may create the job graph 356 from an XML description.

In step 404, Job Manager 14 receives a list of nodes from Name Server 16. Name Server 16 provides Job Manager 14 with the name (or identification) of each node within the network as well as the position of each node within the tree-structured network. In many embodiments, a node is a computing machine. In some embodiments, a computing machine may have more than one node.

In step 406, Job Manager 14 determines which of the nodes are available. A node is available if it is ready to accept another program (associated with a vertex) to execute. In one implementation, Job Manager 14 queries each process daemon to see whether it is available to execute a program. In one implementation, Job Manager 14 assumes that all machines listed by the NS are available. If Job Manager 14 cannot connect to a PD (or if a PD fails to often), then Job Manager 14 marks the PD as unusable. Job Manager 14 may dispatch several copies of each vertex to a set of process daemons chosen according to a scheduling algorithm. In step 408, Job Manager 14 populates all of the available nodes into Node Queue 360. In step 410, Job Manager 14 places all the vertices that need to be executed into Vertex Queue 358. In step 412, Job Manager 14 determines which of the vertices in Vertex Queue 358 are ready to execute. In one embodiment, a vertex is ready to execute if all of its inputs are available.

In step 414, Job Manager 14 sends instructions to the process daemons of the available nodes to execute the vertices that are ready to be executed. Job Manager 14 pairs the vertices that are ready with nodes that are available, and sends instructions to the appropriate nodes to execute the appropriate vertex. In step 416, Job Manager 14 sends the code for the vertex to the node that will be running the vertex code, if that code is not already cached on the same machine or on another machine that is local (e.g., in same sub-network). In most cases, the first time a vertex is executed on a node, its binary will be sent to that node. After executing the binary, that binary will be cached. Thus, future executions of that same code need not be transmitted again. Additionally, if another machine on the same sub-network has the code cached, then the node tasked to run the code could get the program code for the vertex directly from the other machine on the same sub-network rather than from Job Manager 14. After the instructions and code are provided to the available nodes to execute the first set of vertexes, Job Manager 14 manages Node Queue 360 in step 418 and concurrently manages Vertex Queue 358 in step 420.

Managing node queue 418 includes communicating with the various process daemons to determine when there are process daemons available for execution. Node Queue 360 includes a list (identification and location) of process daemons that are available for execution. Based on location and availability, Job Manager 14 will select one or more nodes to execute the next set of vertices. Steps 412-416 may be repeated until all vertices have been run.

Further details of execution engines can be found in U.S. Published Patent Application 2008/0082644, entitled "Distributed Parallel Computing;" U.S. Published Patent Application 2008/0098375, entitled "Runtime Optimization of Distributed Execution Graph;" and U.S. Published Patent Application 2008/0079724, entitled "Description Language for Structured Graphs;" all of which are all hereby incorporated by reference for all purposes.

Figure 6:
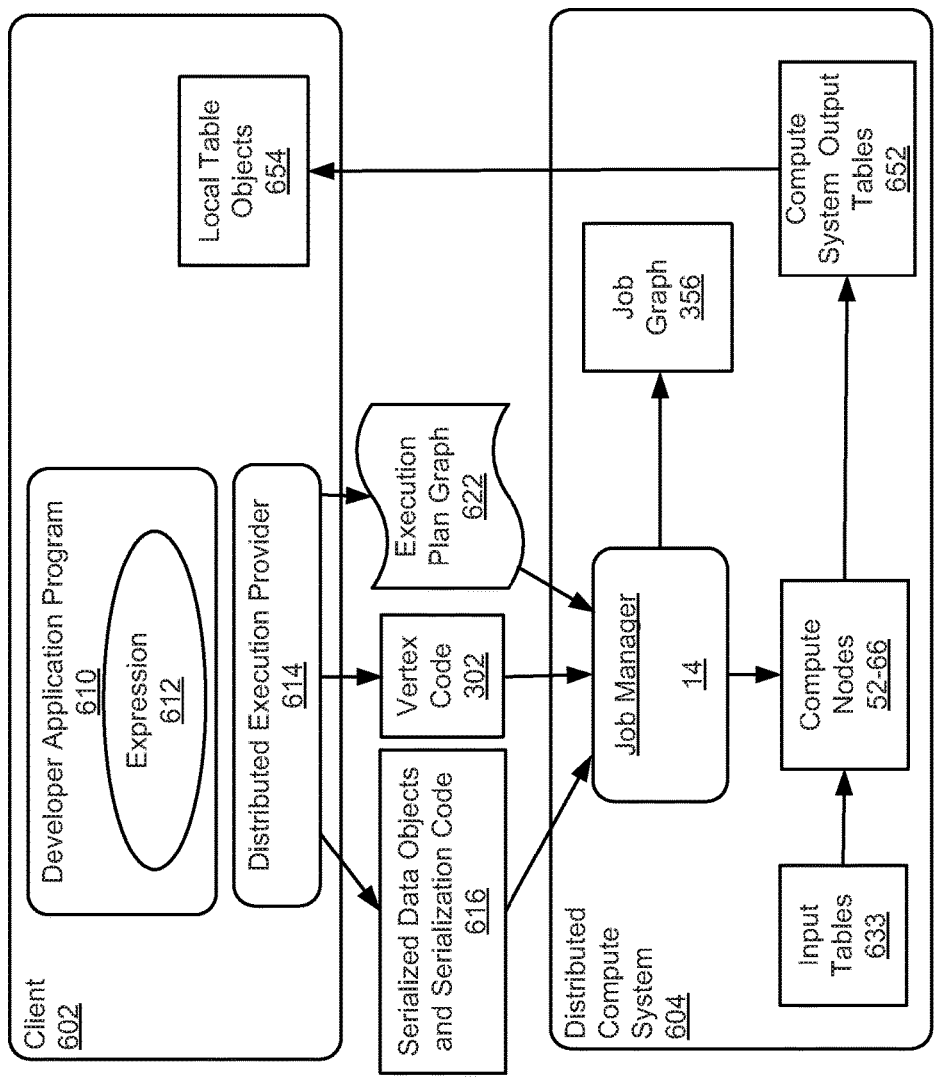
FIG. 6 depicts one embodiment of software and data structures used for data-parallel processing.

FIG. 6 depicts one embodiment of software and data structures used for data-parallel processing. In general, FIG. 6 depicts a client machine 602 and a distributed compute system 604. The client machine 602 may be implemented with computer device 100 depicted in FIG. 2. The client 602 is running an application program 610 and a distributed execution plan 614 that extracts expressions 612 (or expression trees) from the application program 610. Based on the expressions 612, the distributed execution provider 614 generates an execution plan graph ("EPG") 622, vertex code 302, and serialized data objects and serialization code 616, which are each provided to the distributed compute system 604. In this example, Job Manager 14 distributes the vertex code 302 and serialized objects and serialization code 616 to compute nodes 52-66.

Note that the application program 610 may be a sequential program that has code that executes on the client 602 in addition to the data-parallel portions that execute in the distributed compute system 604. For example, the data-parallel code might perform a page-rank of web pages, whereas the code that executes on the client 602 might present the page rank statistics to a user in a graphical user interface. Thus, the application program 610 may be thought of as a "hybrid" program. Note that in some conventional systems two separate programs would need to be written to accomplish what application program 610 performs. For example, a first program might be written in a language such as SQL to perform database queries and second program might be written in a language such as C to perform functions at the client device. Moreover, in some embodiments, the developer does not need to be concerned over which variables are local to the client 602 and which are remote because the distributed execution provider 614 takes care of this.

The application program 610 may have both declarative and imperative operations. The application program 610 may include traditional structuring constructs such as functions, modules, and libraries, and express iteration using standard loops. In some embodiments, the distributed execution plan employs a fully functional, declarative description of the data-parallel components, which enables sophisticated rewritings and optimizations such as those traditionally employed by parallel databases.

In one implementation, the application program 610 is written in the LINQ (Language INtegrated Queries) programming language. A LINQ program is a sequential program composed of LINQ expressions. A LINQ program is a Microsoft .NET Framework component that adds native data querying capabilities to .NET languages. The .NET framework is a software framework that is available with several Windows® operating systems that are available from Microsoft corporation of Redmond, Wash. A LINQ program can be debugged using standard .NET development tools. The application program 610 is not limited to LINQ nor is it limited to the .NET Framework.

Figure 7:
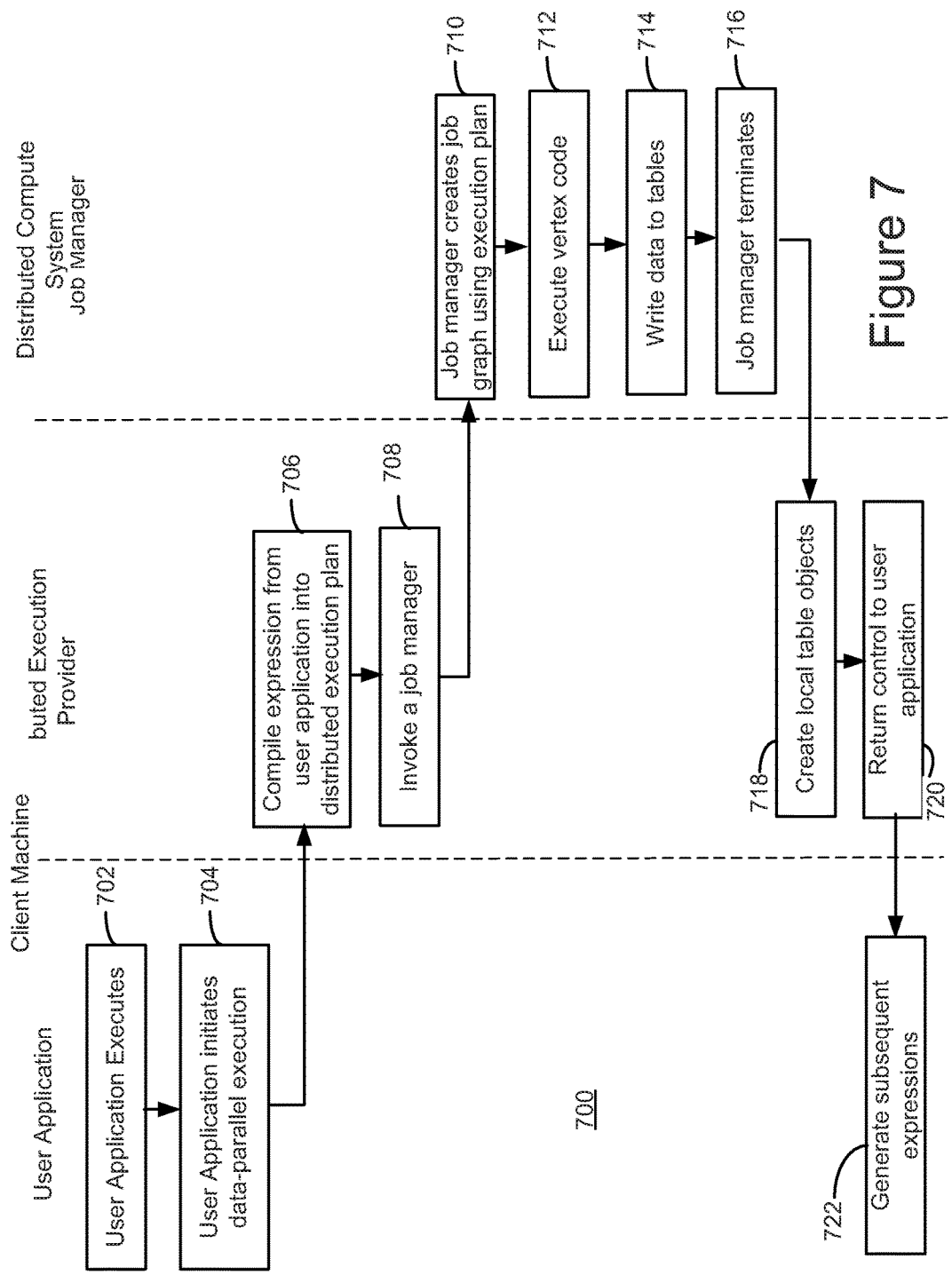
FIG. 7 depicts one embodiment of a process for executing data-parallel portions of the application program in a distributed compute system.

FIG. 7 depicts one embodiment of a process 700 for executing data-parallel portions of the application program 610 in a distributed compute system 604. FIG. 6 will be referred to when discussed the process 700. In step 702, a user application 610 executes on the client machine 602. In one embodiment, the user application 610 is written by the developer in a high level language. In one embodiment, the application program 610 creates one or more expressions 612 during runtime. However, the actual execution of the expression 612 may be deferred until later in the process 700.

In one implementation, the expression 612 is based on classes provided by a .NET library. In one aspect, the expression 612 is base on .NET "Expression" classes. A .NET Expression class is in the namespace System.Linq.Expression. There are numerous subclasses, such as BinaryExpression, ConstantExpression, UnaryExpression, LambdaExpression, MemberAssignment, etc. For example, a expression 612 may be implemented as a tree of expression classes with each node in the tree being an operator. Child nodes may show inputs to operators. As a specific example, the addition of two constants may be represented as a tree with a root of "BinaryExpression" and two leaf nodes containing the constant expressions. Thus, as previously discussed an expression 612 might also be referred to as an expression tree.

In step 704, the user application 610 initiates data parallel execution, which may result the expression 612 being passed to the distributed execution provider 614. In one aspect, the user application 610 makes a call in order to initiate data parallel execution. However, it is not required that the user application 610 make call to initiate data parallel execution. In one aspect, data parallel execution is initiated in response to the user application 610 attempting to enumerate a value for an expression 612. When the user application 610 attempts to enumerate a value for the expression 612, data parallel execution is initiated to compute the value.

In step 706, the distributed execution provider 614 compiles the expression 612 into a distributed execution plan 622. Briefly, step 706 may include the decomposition of the expression 612 into sub-expressions. Each sub-expression corresponds to a vertex. Step 706 may also include the automatic generation of the vertex code, as well as static data for the vertices. Further, serialization code may be automatically generated for the data types needed to execute at the remote computer nodes.

The following briefly describes step 706. Further details are discussed below in the discussion of process 800 of FIG. 8. As previously discussed, in some implementations, the expressions 612 are based on the Expression class of a .NET library. In one aspect, the distributed execution provider 614 manipulates and transforms the expression 612 and breaks it into pieces. In one aspect, each piece is used to generate C# code, which is the vertex code 302. Note that data structures represented by the expressions 612 may be similar to syntax trees that are used by compilers to represent the code during the compilation process.

In step 708, the distributed execution provider 614 invokes a Job Manager 14. In one embodiment, the Job Manager 14 executes behind a firewall. In step 710, Job Manager 14 creates a job graph 356 using the distributed execution plan 622 that was generated in step 704. Job Manager 14 schedules and spawns the vertices as resources become available in the distributed compute system 604. In step 712, each of the vertices executes the code 302 that was generated in step 704. The compute nodes have access to input tables 633 to make computations. The input tables 633 are data that is being processed by the user application 610. Some of the input tables 633 can be based on the result of a previous computation performed by the distributed compute system 604 for the user application 610. However, the data in the input tables 633 can be based on some other external computation. Note that the input tables 633 may be composed of partitions that reside on different machines and that each partition can have replicas on different machines. In step 714, the job completes and the results are output to the distributed compute system output tables 652.

In step 716, Job Manager 14 terminates, returning control back to the distributed execution provider 614. In step 718, the distributed execution provider 614 creates local table objects 654 encapsulating the output of execution in the distributed compute system 604. These local objects 654 may then be used as inputs to subsequent expressions 612 in the user application program 610. In one implementation, local table objects 654 are fetched to the local context only if explicitly de-referenced.

In step 720, control returns to the user application program 610. The user application 610 has access to the local table objects 654. In one implementation, an iterator interface allows the user application 610 to read the local table objects 654 as .NET objects. However, there is no requirement of using .NET objects.

In step 722, the application program 610 may generate subsequent expressions 612, which may be executed by repeating steps 704-720.

Figure 8:
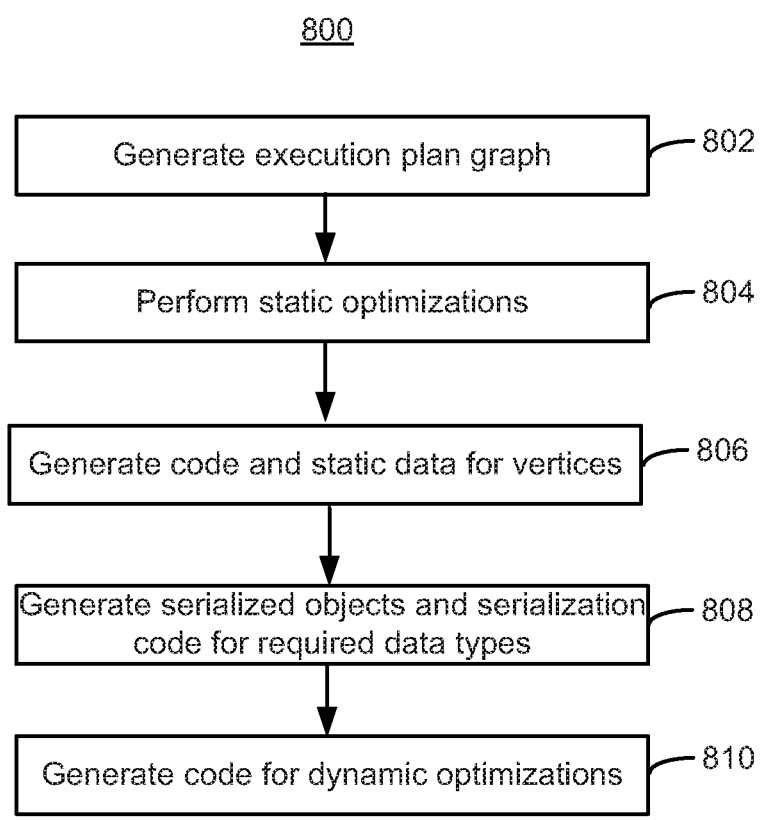
FIG. 8 is one embodiment of a process for compiling expressions from a user application into a distributed execution plan.

FIG. 8 is one embodiment of a process 800 for compiling an expression 612 from a user application 610 into a distributed execution plan. Process 800 is one implementation of step 706 of process 700. In step 802, an execution plan graph (EPG) is generated from an expression 612. Step 802 occurs when the distributed execution provider 614 receives control after the application program 610 initiates parallel processing. The distributed execution provider 614 converts the raw expression 612 into an execution plan graph (EPG) 622, where each vertex is an operator and edges represent its inputs and outputs. The EPG 622 may be related to a conventional database query plan; however, the EPG 622 may encompass computations that are not easily formulated as "queries." The EPG 622 may be a directed graph, which may or may not be acyclic. The existence of common sub-expressions and operators like "Fork" means that EPGs cannot always be described by trees. In some implementations, the EPG 622 is a "skeleton" that is written in a language such as XML. For example, the EPG 622 may be a skeleton of the job data-flow graph 356 that will be executed by the execution engine.

In step 804, static optimizations of the EPG 622 are performed. In one implementation, the distributed execution provider 614 applies term-rewriting optimizations on the EPG 622. In one embodiment, each EPG node is replicated at run time to generate a "stage," which may be defined as a collection of vertices running the same computation on different partitions of a dataset. In one implementation, the optimizer annotates the EPG 622 with metadata properties. For edges of the EPG 622, these annotations may include the data type and the compression scheme, if any, used after serialization. In one implementation, the data types are .NET data types. For nodes of the EPG 622, the annotations may include details of the partitioning scheme used, and ordering information within each partition. The output of a node, for example, might be a dataset that is hash-partitioned by a particular key, and sorted according to that key within each partition. This information can be used by subsequent OrderBy nodes to choose an appropriate distributed sort algorithm. In one aspect, the properties are seeded from the LINQ expression tree and the input and output tables' metadata, and propagated and updated during EPG rewriting.

Propagating these properties may be more difficult than for a conventional database. The difficulties stem from the much richer data model and expression language used to create the application program 610. Consider one of the simplest operations: input.Select(x=>f(x)). If f is a simple expression, e.g. x.name, then it is straightforward for the distributed execution provider 614 to determine which properties can be propagated. However, for arbitrary fit is very difficult to determine whether this transformation preserves the partitioning properties of the input.

Fortunately, the distributed execution provider 614 can usually infer properties in the application programs 610 typical users write. Partition and sort key properties are stored as expressions, and it is often feasible to compare these for equality using a combination of static typing, static analysis, and reflection. In one embodiment, a simple mechanism is provided that allows users to assert properties of an expression 612 when it is difficult or impossible to determine the properties automatically. Further details of static optimizations are discussed below.

In step 806, the vertex code 302 and static data for the vertices are generated. While the EPG 622 encodes all the required information, it is not necessarily a runnable program. In one embodiment, dynamic code generation automatically synthesizes LINQ code to be run at the vertices. The generated code may be compiled into a .NET assembly that is shipped to cluster computers at execution time. The sub-expression in a vertex may be built from pieces of the overall EPG 622. In some implementations, the EPG 622 is created in the original client computer's execution context, and may depend on this context in two ways: (1) The expression 612 may reference variables in the local context. These references are eliminated by partial evaluation of the sub-expression at code-generation time. For primitive values, the references in the expressions 612 may be replaced with the actual values. Object values are serialized to a resource file which is shipped to computers in the cluster at execution time. (2) The expression 612 may reference .NET libraries. In this case, .NET reflection may be used to find the transitive closure of all non-system libraries referenced by the executable, which are shipped to the cluster computers at execution time.

In step 808, serialized objects and serialization code 616 are generated for required data types. As previously mentioned, the user application 610 can be thought of as a hybrid program that has code for executing at the client 602 and code that is executed in parallel in the distributed compute system 604. It may be that the user application 610 refers to a local data object that is needed by the vertex code 302. The serialization code may be bundled with the vertex code 302 and shipped to compute nodes. The serialization code allows the compute nodes to read and write objects having the required data types. The serialized objects are provided to the vertices because the vertex code 302 references those objects. Note that the developer is not required to declare which data is local and which data is remote. The serialization code 616 allows data to be passed in the channels between the vertices. This serialization code 616 can be much more efficient than standard .NET serialization methods since it can rely on the contract between the reader and writer of a channel to access the same statically known datatype.

In step 810, the distributed execution provider 614 generates code for performing dynamic optimizations. Generating code for dynamic optimization is discussed below.

In various embodiments, the distributed execution provider 614 performs both static and dynamic optimizations. The static optimizations may be greedy heuristics or cost-based optimizations. The dynamic optimizations are applied during job execution and may consist in rewriting the job graph depending on run-time data statistics. In various implementations, the optimizations are sound in that a failure to compute properties simply results in an inefficient, though correct, execution plan.

In one embodiment, the static optimizations are conditional graph rewriting rules triggered by a predicate on EPG node properties. Static optimizations may be focused on minimizing disk and network I/O. Some important optimizations include the following. However, many other types of optimizations can be performed.

Pipelining: Multiple operators may be executed in a single process. The pipelined processes may themselves be expressions 612 and can be executed by an existing single-computer LINQ implementation.

Removing redundancy: The distributed execution provider 614 removes unnecessary hash- or range-partitioning steps.

Eager Aggregation: Since re-partitioning datasets is expensive, down-stream aggregations are moved in front of partitioning operators where possible.

I/O reduction: Where possible, the distributed execution provider 614 takes advantage of TCP-pipe and in-memory FIFO channels instead of persisting temporary data to files. In one embodiment, data is by default compressed before performing a partitioning in order to reduce network traffic. Users are allowed to manually override compression settings to balance CPU usage with network load if the optimizer makes a poor decision.

In one embodiment, API hooks are used to dynamically mutate the job graph 356 as information from the running job becomes available. For example, the distributed execution provider 614 provides "callback code" to Job Manager 14. This callback code is added to the job graph 356. During runtime, this callback code causes information to be gathered and used to dynamically mutate the job graph 356. The callback code may also perform the dynamic optimizations based on the gathered information.

In one implementation, the mutation is based on aggregation. Aggregation gives a major opportunity for I/O reduction since it can be optimized into a tree according to locality. Data may be aggregated first at the computer level, next at the rack level, and finally at the cluster level. The topology of such an aggregation tree can only be computed at run time, since it is dependent on the dynamic scheduling decisions which allocate vertices to computers. The distributed execution provider 614 may use techniques discussed in U.S. Published Patent Application 2008/0098375, entitled "Runtime Optimization of Distributed Execution Graph, which has already been incorporated herein by reference in its entirety.

In one embodiment, dynamic data partitioning is used. Dynamic data partitioning sets the number of vertices in each stage (i.e., the number of partitions of each dataset) at run time based on the size of its input data. Conventional databases usually estimate dataset sizes statically, but these estimates can be very inaccurate. As one example, the estimates may be inaccurate in the presence of correlated queries. In one embodiment, dynamic hash and range partitions are supported. For range partitions both the number of partitions and the partitioning key ranges are determined at run time by sampling the input dataset.

Figure 9:
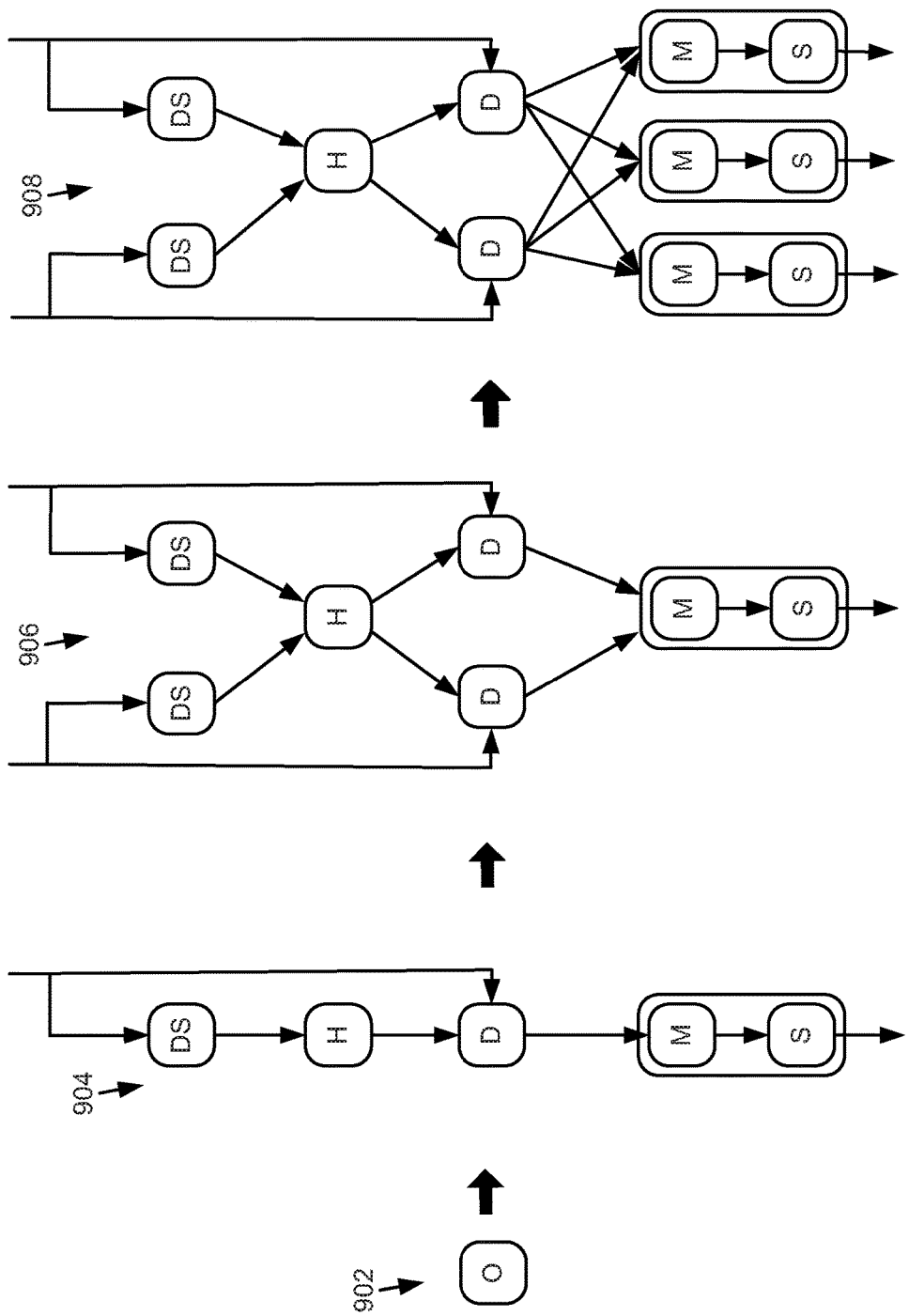
FIG. 9 depicts one embodiment of static and dynamic optimizations of a graph.

The following example for sorting a dataset d illustrates many of the static and dynamic optimizations available. Different strategies are adopted depending on d's initial partitioning and ordering. FIG. 9 shows the evolution of an OrderBy node O 902 in a complex case, where d is not already range-partitioned by the correct sort key, nor are its partitions individually ordered by the key. The transformation of OrderBy node O 902 to graph 904 is static. The transformation of graph 904 to graph 906 and then graph 906 to graph 908 are both dynamic, based on information learned at runtime.

Referring now to graph 904, first the dataset is re-partitioned. The DS stage performs deterministic sampling of the input dataset. The samples are aggregated by a histogram vertex H, which determines the partition keys as a function of data distribution (load-balancing the computation in the next stage). The D vertices perform the actual repartitioning, based on the key ranges computed by H. Next, a merge node M interleaves the inputs, and a S node sorts them. M and S are pipelined in a single process, and communicate using iterators.

The number of partitions in the DS+H+D stages of graph 906 is chosen at run time based on the number of partitions in the preceding computation. The number of partitions in the M+S stages of graph 908 is chosen based on the volume of data to be sorted.

As previously discussed, some embodiments use the LINQ framework. One of the benefits of using the LINQ framework is that other systems that use the same or similar constructs can be leveraged. For example, PLINQ, which allows code to be run within each vertex in parallel on a multi-core server, can be leveraged. PLINQ is described in, "A Query Language for Data Parallel Programming," J. Duffy, Proceedings of the 2007 Workshop on Declarative Aspects of Multicore Programming, 2007, which is hereby incorporated by reference for all purposes. PLINQ attempts to make the process of parallelizing a LINQ program as transparent as possible. PLINQ employs the iterator model since it is better suited to fine-grain concurrency in a shared-memory multi-processor system. Because both PLINQ and embodiments of the present invention use expressions composed from the same LINQ constructs, their functionality may be combined. In some embodiments, vertices execute LINQ expressions, and in general the addition by the code generator of some embodiments of a single line to the vertex's program triggers the use of PLINQ, allowing the vertex to exploit all the cores in a cluster computer.

In some implementations, interoperation with a LINQ-to-SQL system allows vertices to directly access data stored in SQL databases. Running a database on each cluster computer and storing tables partitioned across these databases may be much more efficient than using flat disk files for some applications. Application programs 610 can use "partitioned" SQL tables as input and output in some embodiments. The distributed execution provider 614 of some embodiments identifies and ships some subexpressions to the SQL databases for more efficient execution.

Further, a single-computer LINQ-to-Objects implementation allows applications programs 610 to be run on a single computer for testing on small inputs under the control of a debugger before executing on a full cluster dataset. In one implementation, the debugger is a part of the Visual Studio® development system, which is available from Microsoft Corporation of Redmond, Wash. Debugging a distributed application is a notoriously difficult problem. Distributed application jobs may be long running, processing massive datasets on large clusters, which could make the debugging process even more challenging. One embodiment is a mechanism to run applications on a single computer with very sophisticated support from the .NET development environment. Once an application is running on the cluster, an individual vertex may fail due to unusual input data that manifests problems not apparent from a single-computer test. One aspect uses a deterministic-replay execution model, which allows re-execution of such a vertex in isolation with the inputs that caused the failure, and the system includes scripts to ship the vertex executable, along with the problematic partitions, to a local computer for analysis and debugging.

Performance debugging is a much more challenging problem. In some embodiments, programs report summary information about their overall progress. However, if particular stages of the computation run more slowly than expected, or their running time shows surprisingly high variance, it may be necessary to investigate a collection of disparate logs to diagnose the issue manually. The centralized nature of the job manager makes it straightforward to collect profiling information to ease this task.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A machine implemented method, comprising
running a sequential program written in a high-level language on a computing machine having a processor, the sequential program including imperative operations executable on the computing machine and a data-parallel portion including a declarative operation executable in a distributed compute system;
identifying, by the processor, an expression in the declarative operation from the data parallel portion of the program;
translating, by the processor, the expression into a plurality of subexpressions executable in parallel on nodes in the distributed compute system;
providing the plurality of subexpressions to the distributed compute system to execute in parallel on the nodes; and
sequentially executing, by the processor on the compute machine, the imperative operations.

2. The machine implemented method of claim 1, wherein translating the expression into a plurality of subexpressions comprises:
accessing the expression from the declarative operation; and
based on the expression, generating an execution plan graph having vertices and edges between the vertices, wherein each of the sub-expressions is a vertex in the execution plan graph, and
the distributed compute system is to execute the subexpressions in parallel on the nodes according to the execution plan graph.

3. The machine implemented method of claim 2, further comprising:
generating vertex code for the vertices of the execution plan graph; and
generating code that allows data to be passed in data channels based on the edges,
wherein the execution of the subexpressions in parallel is based on the vertex code and the code.

4. The machine implemented method of claim 3, further comprising:
accessing results of executing the execution plan graph, the vertex code and the code that allows data to be passed in the data channels; and
executing at least one of the imperative operations to present the results in a user interface.

5. The machine implemented method of claim 4, further comprising:
providing the execution plan graph, the vertex code, and the code to a job manager to execute the execution plan graph and to produce the results.

6. The machine implemented method of claim 2, wherein the execution plan graph is a directed graph.

7. The machine implemented method of claim 2, wherein the vertices of the execution plan graph represent processes.

8. A non-transitory computer-readable medium comprising machine readable instructions executable by a processor to:
run a sequential program written in a high-level language on a computing machine having the processor, the sequential program including:
imperative operations executable on the computing machine, and
a data-parallel portion including a declarative operation executable in a distributed compute system;
identify an expression in the declarative operation from the data parallel portion of the program;
translate the expression into a plurality of subexpressions executable in parallel on nodes in the distributed compute system;
provide the plurality of subexpressions to the distributed compute system to execute in parallel on the nodes; and
sequentially execute on the compute machine, the imperative operations.

9. The non-transitory computer-readable medium of claim 8, wherein the machine readable instructions to translate the expression comprise instructions executable by the processor to:
access the expression from the declarative operation; and
based on the expression, generate an execution plan graph having vertices and edges between the vertices,
wherein each of the sub-expressions is a vertex in the execution plan graph, and
the distributed compute system is to execute the subexpressions in parallel on the nodes according to the execution plan graph.

10. The non-transitory computer-readable medium of claim 9, wherein the machine readable instructions are executable by the processor to:
generate vertex code for the vertices of the execution plan graph; and
generate code that allows data to be passed in data channels based on the edges, wherein the execution of the subexpressions in parallel is based on the vertex code and the code.

11. The non-transitory computer-readable medium of claim 10, wherein the machine readable instructions are executable by the processor to:
   access results of executing the execution plan graph, the vertex code and the code that allows data to be passed in the data channels; and
   execute at least one of the imperative operations to present the results in a user interface.

12. The non-transitory computer-readable medium of claim 11, wherein the machine readable instructions are executable by the processor to:
   provide the execution plan graph, the vertex code, and the code to a job manager to execute the execution plan graph and to produce the results.

13. The non-transitory computer-readable medium of claim 9, wherein the execution plan graph is a directed graph.

14. The non-transitory computer-readable medium of claim 9, wherein the vertices of the execution plan graph represent processes.

15. A device comprising:
   a processor readable storage hardware device;
   a processor coupled to the processor readable hardware storage device, wherein the processor readable hardware storage device includes instructions that cause the processor to:
   execute a sequential application program comprising a data parallel portion that includes an expression, wherein the sequential application program is written in a high level language and comprises both imperative operations and declarative operations;
   access the expression from a portion of the sequential application program that comprises a declarative operation;
   execute subexpressions for the expression in parallel; and
   execute a portion of the sequential application program that comprises an imperative operation in sequence.

* * * * *